United States Patent [19]

Nozaki

[11] Patent Number: 5,035,937
[45] Date of Patent: Jul. 30, 1991

[54] WEATHER STRIP

[75] Inventor: Masahiro Nozaki, Aichi, Japan

[73] Assignee: Toyoda Gosei Co., Ltd., Nishikasugai, Japan

[21] Appl. No.: 550,169

[22] Filed: Jul. 9, 1990

[30] Foreign Application Priority Data

Jul. 26, 1989 [JP] Japan .................. 1-086833

[51] Int. Cl.$^5$ .............................................. E06B 7/16
[52] U.S. Cl. .................................. 428/122; 49/490;
52/716; 428/192; 428/358
[58] Field of Search ............... 428/122, 192, 358;
49/490; 52/716

[56] References Cited

U.S. PATENT DOCUMENTS 4,379,376  4/1983  Adell ............................... 428/122 X
4,708,898  11/1987  Gommier et al. ............... 428/122 X

FOREIGN PATENT DOCUMENTS 59-77939  5/1984  Japan .
63-290714  11/1988  Japan .

Primary Examiner—Henry F. Epstein
Attorney, Agent, or Firm—Cushman, Darby & Cushman

[57] ABSTRACT

A extruded weather strip having a trim (2) and a seal lip (4) is provided with a cutout (51,52) having a base side (42) of a length (L) and an edge side (41) of a length (G1, G2) smaller than that of the base side (41). The weather strip is placed in a mold with a portion of the trim (2) corresponding to the cutout (51, 52) bent in the shape of a desired corner, thereby expanding the cutout, and a molding material is injected into the mold to form a corner seal lip (61) in the cutout, integral with the seal lip 4. Therefore, even after storage in an unstressed condition, a crimp which would prevent conformance of the corner seal lip 61 will not be formed.

4 Claims, 4 Drawing Sheets

WEATHER STRIP

BACKGROUND OF THE INVENTION

1. Field of the Invention

The present invention relates to a weather strip having one or more corners, and including a trim with a seal lip extending from the trim which is expanded when the trim is bent in a curved shape. The weather strip of the invention can be used as a weather strip for various purposes, particularly, as an automotive weather strip for a trunk, a quarter window, or an opening trim.

2. Description of the Related Art

Conventionally, when forming a weather strip having a trim and a seal lip extending from the trim, a U-shaped cut is formed in the seal lip across the edge of the same at a portion corresponding to a portion of the trim to be bent in a curve to form a corner, the weather strip is placed in a mold with the trim bent in a desired curved shape thereby expanding the U-shaped cut, and a corner seal lip is formed in the expanded cut, integrally with the seal lip, by molding. See, for example, Japanese Unexamined Patent Publication (Kokai) Nos. 63-290714 and 59-77939.

FIG. 1A and 1B show a weather strip for a luggage compartment, formed by the above-described conventional technique. This weather strip has a trim 2, integrally provided with an insert 8, a hollow lip 32 which a trunk lid contacts, and a seal lip 4 extending from the lower edge of the outer wall of the trim 2. The weather strip is formed by extrusion. A corner seal lip 63 is formed integrally with the seal lip 4 in a corner of the same. The corner seal lip 63 is formed by forming a U-shaped cut 53 having a fixed length L from the edge 41 of the seal lip 4 to the base side 42 thereof at a portion of the seal lip 4 corresponding to the corner, setting the weather strip in a mold with a portion thereof bent in a desired shape to expand the cut 53, and forming the corner seal lip 63 in the expanded cut 53, integrally with the seal lip 4, by molding.

The material for forming a weather strip having small holding lips 9 within the trim by extrusion, in general, must have a relatively high hardness in view of the necessary hardness of the holding lips and the fitting stability of the weather strip. On the contrary, the material for forming such a weather strip by molding must have a comparatively low hardness in view of the run of the material in the cavity of a mold having a complex shape. Accordingly, the hardness of a solid rubber formed by molding is typically less than that of a solid rubber formed by extrusion; that is, the solid rubber formed by molding is usually softer than the solid rubber formed by extrusion.

When the corner seal lip 63 is formed in the expanded cut of the seal lip with the weather strip bent as shown in FIG. 1A, the restoring force of the trim indicated by arrows F1 compresses the corner seal lip 63 because corner seal lip 63 is formed of a material softer than the material used for forming the extruded portion. Consequently, the weather strip tends to return to its initial shape, namely, the shape before the formation of the corner seal lip 63, and the radius of curvature of the corner increases with time. Eventually, the edge of the corner seal lip 63, particularly, portions of the edge contiguous with the extruded portions are crimped as shown at 10. The shape of the weather strip stabilizes after the curvature of the corner has decreased to some extent.

When setting the weather strip on the body of an automobile, the corner of the weather strip is bent again in the shape formed in the mold, but the crimps 10 are set in permanent strains while the weather strip is kept in stock, so that the permanently crimped portion of the seal lip corresponding to the corner of the weather strip does not exactly conform to the shape of corresponding surface of the body.

SUMMARY OF THE INVENTION

An object of the present invention is to solve the foregoing problem by providing a weather strip having a novel construction having a molded corner seal lip formed of a material softer than the material used for the extruded portion but which does not crimp.

To achieve this object, a weather strip, such as shown in FIGS. 5A and 5B, formed by extrusion and having a trim 2 and a seal lip 4 is provided with a cut 51 having an open end of a length $G_1$ coinciding with the edge 41 of the seal lip 4, and a bottom side having a length L greater than the length $G_1$ in the seal lip 4. The weather strip is placed in a mold with a portion of the trim 2 corresponding to the cut 51 bent in the shape of a desired corner which in turn expands the cut 51, and a molding material is injected into the mold to form a corner seal lip 61 in the cut 51, integral with the seal lip 4.

When the weather strip is in an unstressed state, the restoring force of the trim 2 induces a compressive stress in the molded corner seal lip 61. The length $G_{11}$ of the edge of the corner seal lip 61, in which a maximum compressive stress is induced, is only a fraction of the length (the length $L_1$ in FIG. 1A) of the edge of the molded corner seal lip formed in the seal lip of the conventional weather strip. Therefore, only a relatively small bending stress, which is proportional to the square of the length, is induced in the molded corner seal lip 61, and, as a result, a crimp, which prevents the corner seal lip 61 from conforming to the body, is not formed in the corner seal lip 61.

That is, the length of the edge of the corner seal lip which is formed in the cut and has a long bottom portion and a narrow outer portion defining the edge of the seal lip, is far smaller than that of the edge of the corner seal lip of the conventional weather strip. Thus, the corner seal lip is sufficiently capable of withstanding compressive stress induced by the restoring force of the trim and is sufficiently resistant to crimping. As a result, the corner seal lip, as well as the remaining portions of the seal lip, conforms satisfactory to the corresponding surface of the body of an automobile.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DESCRIPTION OF THE PREFERRED EMBODIMENTS

Example 1

Figure 2A:
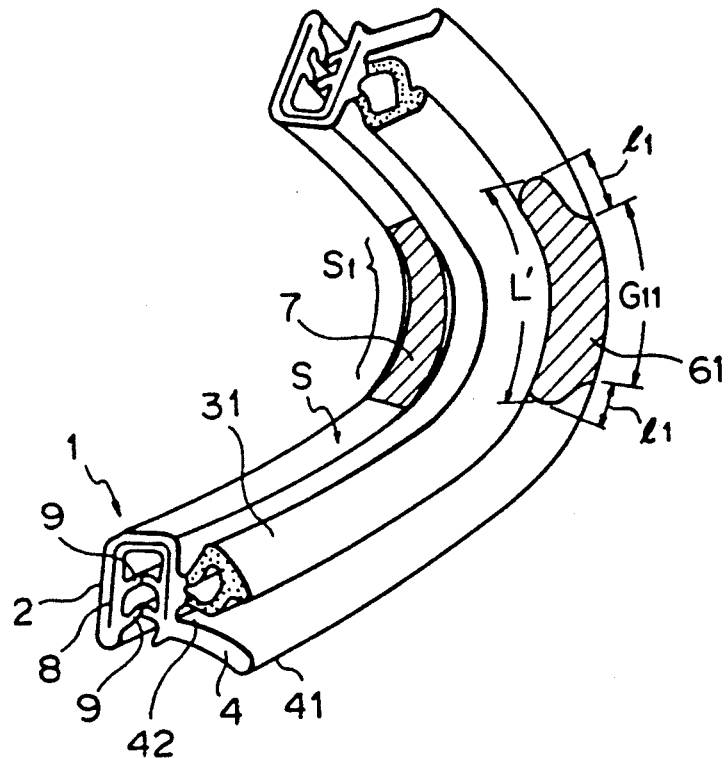
FIG. 2A is a perspective view showing a portion of a weather strip in accordance with a first embodiment of the present invention corresponding to a corner portion A shown in FIG. 3.
Figure 3:
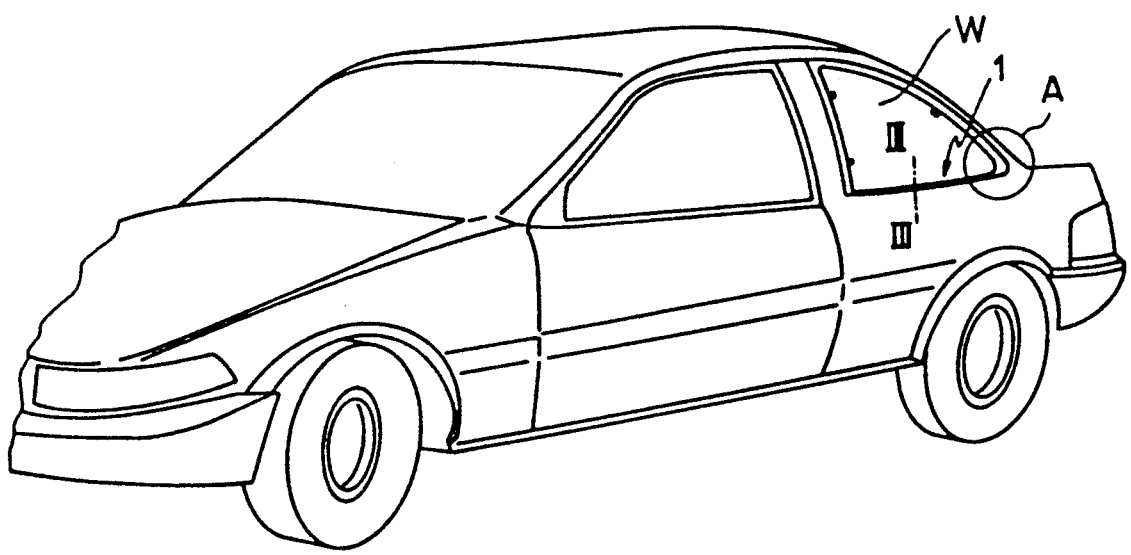
FIG. 3 is a schematic perspective view showing a portion of an automobile to which the weather strip of FIGS. 1A and 1B is applied.
Figure 4:
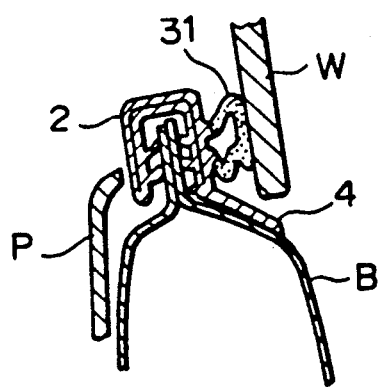
FIG. 4 is a sectional view taken on line III—III in FIG. 3.

The present invention was embodied in a weather strip 5 for the quarter window W of an automobile as shown in FIG. 3. FIG. 2A is a fragmentary perspective view of a portion of the weather strip corresponding to a corner portion indicated at A in FIG. 3, and FIG. 4 is a sectional view taken on line III—III in FIG. 3. Referring to FIGS. 2A and 4, the weather strip 1 has a trim 2 integrally provided with an insert 8, a hollow lip 31 extending from the outer wall of the trim 2 so as to be in contact with the window glass W, and a seal lip 4 of with $d_0$ extending from the lower edge of the outer wall of the trim 2 at an angle to the outer wall of the trim 2 for close contact with the surface of the body B.

The weather strip 1 can be produced by extrusion. The hollow lip 31 can be formed of EPDM sponge rubber and the remaining portions of the weather strip 1 can be formed of EPDM solid rubber with a shore hardness of 60.

A portion of the seal lip 4 is punched to form a cut 51 having a rectangular bottom portion of L in length and $d_1$ in width, and a central outer portion of $G_1$ in length, opening in the edge of the seal lip 4. The length $G_1$ is approximately a third the length L; the length L is 50 mm; the width $d_1$ is about two-thirds the width $d_0$. The weather strip 1 is then placed in a mold with the trim 2 bent in a portion corresponding to the cut 51 in a shape conforming to the corner A, thereby expanding the cut 51. Then, a corner seal lip 61 was formed in the expanded cut 51 and a pad 7 was formed over a curved portion $S_1$ of the backside S of the trim 2 corresponding to the cut 51 by molding EPDM solid rubber with a shore hardness of 40.

Figure 1A:
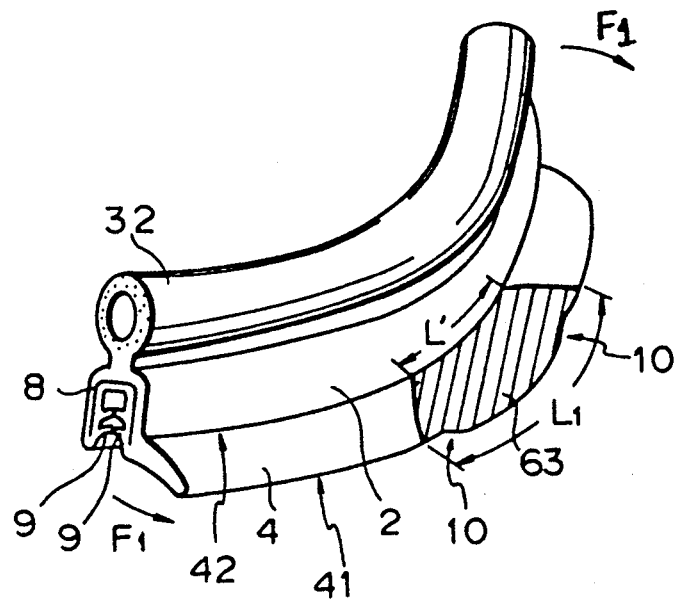
FIG. 1A is a perspective view of a conventional weather strip.
Figure 1B:
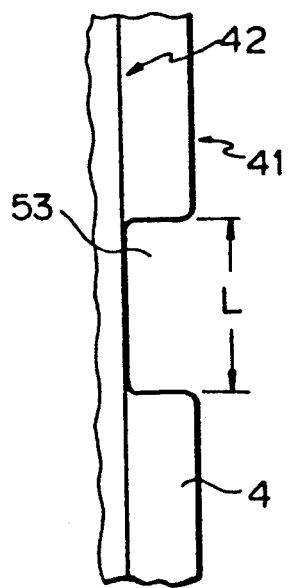
FIG. 1B is an illustration for explaining the shape of a cut formed in the seal lip of the weather strip of FIG. 1A.
Figure 2B:
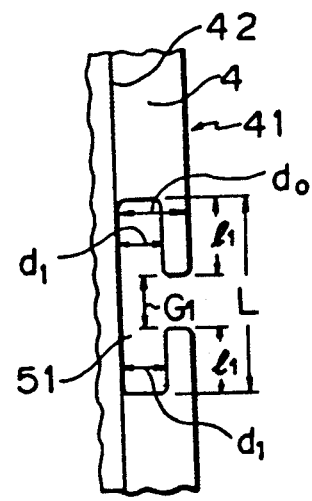
FIG. 2B is an illustration for explaining the shape of a cut formed in the seal lip of the weather strip of FIG. 2A.

The length $G_{11}$ of the edge of the molded corner seal lip 61 of the weather strip 1 thus fabricated (FIGS. 2A and 2B) is smaller by far than the length $L_1$ of the edge of the corner seal lip 63 formed in the cut formed by expanding the rectangular cut 53 in the conventional weather strip (FIGS. 1A and 1B). Therefore, the corner seal lip 61 can withstand compressive stress induced by the restoring force of the trim 2 and any crimp, such as the crimp 10 which developed in the conventional corner seal lip 63 as shown in FIG. 1A, was not developed in the edge of the corner seal lip 61 (FIG. 2A). The pad 7 formed on the backside S of the trim 2 suppressed the restoring action of the trim 2 and covered small creases which developed in the curved portion $S_1$ to provide the backside S with a smooth appearance.

Further, the corner seal lip 63 and pad 7 were formed of the same material, but the shore hardness thereof was different than that of the trim 2 and lip 4. Nevertheless, there were no differences in the appearance of the portions 63 and 7.

When the weather strip 1 was applied to the quarter window W of the automobile as shown in FIGS. 3 and 4, any crimp, such as the crimp 10 shown in FIG. 1A, was not formed in the seal lip 4 in the portion corresponding to the corner portion A of the quarter window, the seal lip 4 conformed closely to the corresponding surface of the body B for perfect sealing, no fault, such as crimps in the corner portion of the seal lip and creases in the corner portion of the backside of the trim of the conventional weather strip, were formed, and the trim 2 which projected from the edge of a garnish panel P had a satisfactory appearance.

Example 2

Figure 5A:
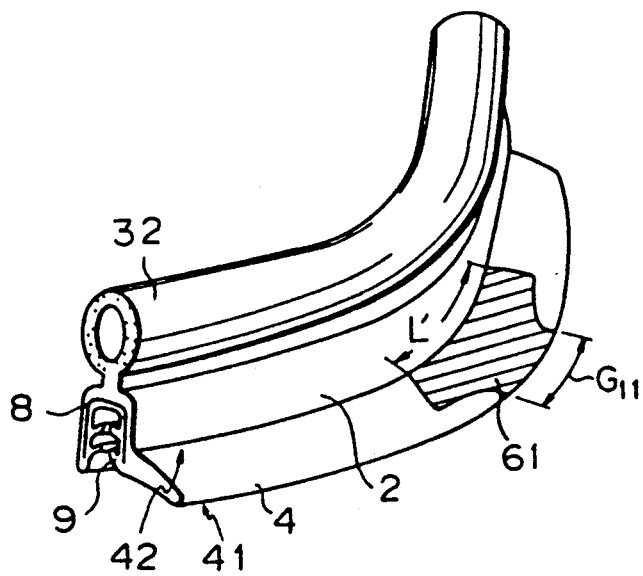
FIG. 5A is a perspective view of a weather strip in accordance with a second embodiment of the present invention.

The present invention was embodied as a weather strip for the trunk of an automobile in accordance with the second example. The weather strip has a trim 2 integrally provided with an insert 8 having a cross section resembling the letter U. A hollow lip 32 extends from the top surface of the trim 2 and a seal lip 4 obliquely extends from the lower edge of the outer wall of the trim 2 (FIG. 5A).

The weather strip can be produced by extrusion. The hollow lip 32 is formed, for example, of EPDM sponge rubber and the remaining portions of the weather strip can be formed, for example, of EPDM solid rubber with a shore hardness of 60.

Figure 5B:
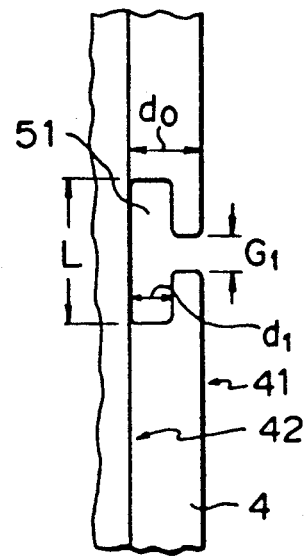
FIG. 5B is an illustration for explaining the shape of a cut formed in the seal lip of the weather strip of FIG. 5A.

As shown in FIG. 5B, a cut 51 having the same shape as that of the cut 51 of the example 1 was formed in the seal lip 4. The weather strip was placed in a mold with the trim 2 bent in a desired shape, thereby expanding the cut 51, and then a corner seal lip 61 was formed of EPDM solid rubber with a hardness of 40 (Shore hardness) in the expanded cut 51 by injection molding.

The length $G_{11}$ of the molded corner seal lip 61 of the weather strip thus fabricated is smaller by far than the length $L_1$ (FIG. 1A) of the edge of the corner seal lip of the conventional weather strip. Consequently, the corner seal lip 61 can withstand compressive stress induced by the restoring force of the trim 2, and a crimp, such as the crimp 10 in FIG. 1A, does not develop in the edge of the molded corner seal lip 61 even a long time after fabrication. Further, corner seal lip, as well as the seal lip in the straight portion of the weather strip, conforms perfectly to the corresponding surface of the body resulting in perfect sealing when the weather strip was applied to the trunk of the automobile.

Example 3

Figure 6A:
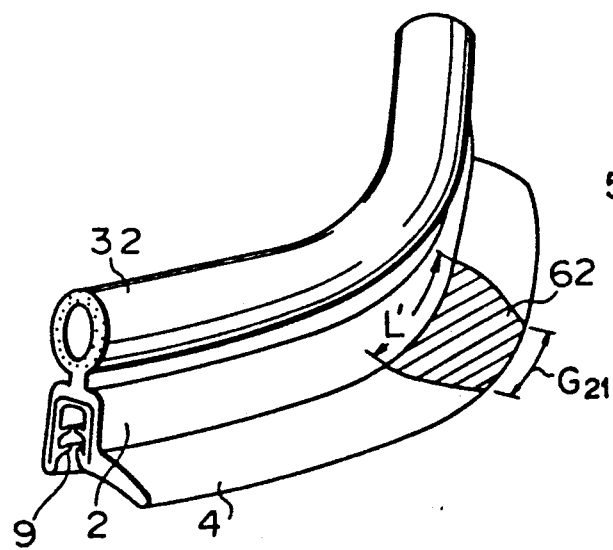
FIG. 6A is a perspective view of a weather strip in accordance with a third embodiment of the present invention.
Figure 6B:
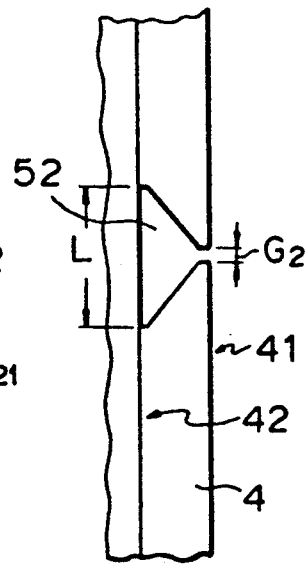
FIG. 6B is an illustration for explaining the shape of a cut formed in the seal lip of the weather strip of FIG. 6A.

In FIGS. 6A and 6B, yet a further embodiment of the invention is a weather strip for the trunk of an automobile. The weather strip in the third example is the same in construction as that in example 2. However, the cut 52 of example 3 is different from that of example 2. The cut 52 has a substantially triangular shape having a very small gap $G_2$ opening in the edge of a seal lip 4 (FIG. 6B).

The weather strip was fabricated by the same processes as that for fabricating the weather strip in the example 2.

The weather strip in the example 3 was the same as the weather strip in the example 2 in effect and function and similarly achieved the object of the present device.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

I claim:

1. A weather strip having a trim and a flat type seal lip, said seal lip having a base longitudinal side where said seal lip is coupled to said trim and a free longitudinal edge, wherein a cutout is defined along a portion of the length of said seal lip, said cutout having a base side of length L and an edge side coinciding with said free longitudinal edge of said seal lip, said edge side having a length G which is smaller than said length L, even when said trim is bent as a corner, and a corner seal lip molded in said cutout so as to be integral with said seal lip, wherein said corner seal lip is molded from a material having a hardness less than a material from which said seal lip is molded, and wherein said trim is bent into a curved shape so as to define a corner portion, said cutout being defined at said corner portion.

2. A weather strip as claimed in claim 1, further comprising a pad molded over a curved portion of a back side of the trim corresponding to said cutout.

3. A weather strip as claimed in claim 2, wherein said pad is molded from the same material as the material from which said corner seal lip is molded.

4. A weather strip as claimed in claim 3, wherein said material of said corner seal lip has a hardness less than a hardness of a material for forming said seal lip.

* * * * *